United States Patent [19]
Cheng

[11] Patent Number: 5,563,883
[45] Date of Patent: Oct. 8, 1996

[54] DYNAMIC CHANNEL MANAGEMENT AND SIGNALLING METHOD AND APPARATUS

[76] Inventor: Alexander L. Cheng, 11 Sprindale Ave., White Plains, N.Y. 10604

[21] Appl. No.: 276,534

[22] Filed: Jul. 18, 1994

[51] Int. Cl.$^6$ ............................................. H04H 1/04
[52] U.S. Cl. ..................... 370/73; 348/12; 370/85.7; 370/85.8; 455/4.2; 455/5.1
[58] Field of Search ................... 348/6, 9, 12, 13; 455/3.1, 4.2, 5.1, 6.1, 34.1; 379/71, 73, 76, 80, 85.3, 85.7, 85.8, 95.1, 95.2

[56] References Cited

U.S. PATENT DOCUMENTS

| | | | |
|---|---|---|---|
| 4,573,206 | 2/1986 | Grauel et al. | 455/34.1 |
| 5,132,680 | 7/1992 | Tezuka et al. | 370/85.8 |
| 5,224,097 | 6/1993 | Kaneshima | 370/85.8 |
| 5,331,316 | 7/1994 | Mestdagh | 370/85.7 |
| 5,355,375 | 10/1994 | Christensen | 370/85.8 |
| 5,374,952 | 12/1994 | Flohr | 348/12 |
| 5,434,611 | 7/1995 | Tamura | 348/12 |

*Primary Examiner*—Benedict V. Safourek

[57] ABSTRACT

There is provided a dynamic and adaptable method and apparatus to support two-way multi-media communication services on a multiple access communication system, which comprises a central controller, a shared transmission media and a plurality of remote terminals dispersed throughout the network. The central controller comprises switch and control apparatus and a pool of transmitters and receivers. The communication channels between the central controller and remote terminals are arranged for signalling data and traffic bearer channels in the forward and reverse directions. The number of signalling data channels is adjusted to satisfy the traffic requirements and for redundancy purposes. The forward and reverse signalling data channels are coupled in different mappings to support terminal grouping. Multiple access of the remote terminals for the upstream traffic are mitigated by separating remote terminals in groups via the channel allocation and the terminal assignment process. Communication between the central controller and the remote terminals follows a multiple access scheme controlled by the central controller via polling procedure on each of the forward signalling data channels independently. In case of collision, the central controller engages the remote terminals in a selective polling process to resolve the contention. The overlapping polling method of the controlled access scheme increases the utilization of the signalling channel and reduces the time required to gain access to the shared transmission media. By dynamically adjusting the load on signalling data channels, the signalling process is greatly improved for efficiency and redundancy against anomalies with the added benefit of improved flexibility and extensibility. The system is especially useful in a two-way CATV network.

20 Claims, 16 Drawing Sheets

Signalling data frame in the forward direction sent by central controller:

| 1 | 1 | 3 | 1 |
|---|---|---|---|
| PMB | TID | SAT | FCS |

Signalling data frame in the reverse direction sent by remote terminals:

| 1 | 1 | 3 | 1 | bytes |
|---|---|---|---|---|
| PMB | TID | SRT | FCS | | preamble (PMB)
- sequence to indicate the start of message frame transmission and aid detection of collision Terminal IDentifier (TID)
- terminal identifier for command
- lower TID of the range for the selective poll
- 0 (hexadecimal 00) is an invalid TID used for disabling terminal during the registration process (SAT/SRT contains the serial number)
- 255 (hex FF) for registration process (SAT/SRT contains the serial number)

Signalling Action Type (SAT)
- serial number of the remote terminal for channel assignment during registration process
- selective poll including higher TID of the range (used also for general/specific poll)
- selective poll with collision alert including higher range (used also for specific poll)
- in-coming call command on the indicated channel number
- release command
- disable command
- test command
- channel re-assignment command Signalling Request Type (SRT)
- serial number of the remote terminal for terminal registration process
- on-hook
- off-hook
- switch-hook
- ringing
- release
- dial-digits
- incoming call blocking
- incoming call unblocking
- feature code (e.g., conference)
- test report
- alarm message (fault and fraud)
- multiple channel request (bandwidth-on-demand)
- channelized services (sub-rate & multiple channels)

Frame Check Sequence (FCS)
- protection, which covers TID and SAT/SRT fields, against transmission error or collision

Figure 9

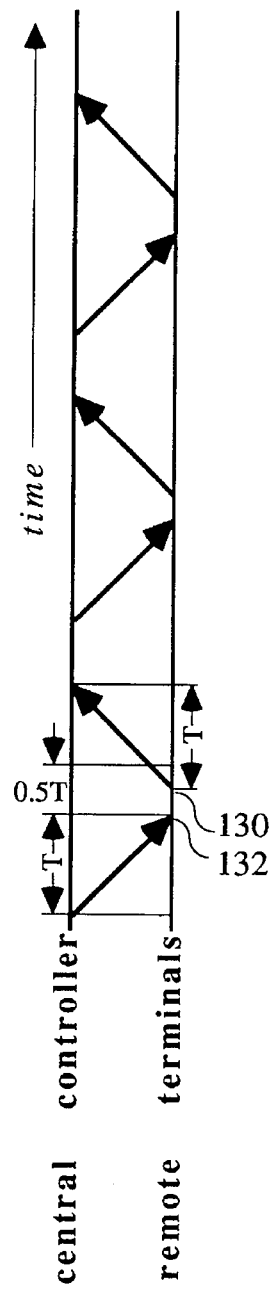 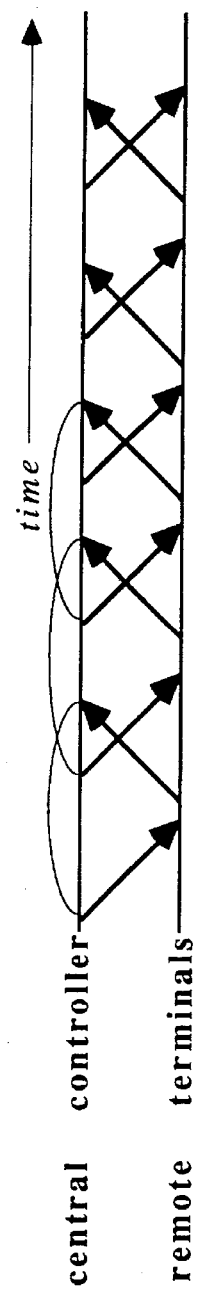
Figure 13a
Figure 13b

DYNAMIC CHANNEL MANAGEMENT AND SIGNALLING METHOD AND APPARATUS

FIELD OF THE INVENTION

The present invention pertains generally to methods and apparatus for facilitating the two-way multi-media communication based on a shared transmission media such as coaxial cable-TV network, and more specifically to methods and apparatus for signalling channel management and protocol.

BACKGROUND OF THE INVENTION

A multiple access communication system comprises a central controller, a shared transmission media and a plurality of remote terminals dispersed geographically. To provide the means for multiple access is a classical problem in communication systems with a shared common transmission media. Some of the well known schemes are frequency division multiple access or FDMA, time division multiple access or TDMA, and code division multiple access or CDMA. These multiple access schemes deal with the techniques of separating the communication bandwidth into traffic-bearing channels. In a FDMA scheme, the communication bandwidth is divided into the frequency bands. The TDMA scheme separates the communication bandwidth into time slots. The traffic is encoded and then decoded using different code in a CDMA scheme.

In all these multiple access schemes the contention for access is resolved through signalling protocols on a pre-determined and fixed signalling channel. There are proposals to dynamically allocate traffic-bearing channels to meet the service requirements in terms of lower blocking probability. However, in addition to availability, bandwidth and delay of the traffic-bearing channel, the traffic requirements should include responsiveness of the signalling process and the quality of the transmission means.

The signalling protocols for multiple access communication systems fall in two general categories for resolving the possible contention: scheduled access via polling or other means, and random access contention. In radiotelephony and local-area-network (CSMA/CD) environment, the contention is resolved by monitoring the signal during transmission, which requires synchronization and/or means to monitor activities amongst all remote terminals and the central controller. In the CATV network, remote terminals have different distance from the central controller making synchronization difficult. It is also not feasible to detect collision, i.e., multiple remote terminals transmit at the same time, on the CATV network since the remote terminals are attached to different branches of the network. The poll and response method is often used to schedule the multiple access from plurality of remote terminals, but it has the disadvantage of inefficiency due to wasteful interaction with remote terminals that are not in need of servicing.

DESCRIPTION OF THE RELATED ART

There are many proposals of means for dynamically adjusting the number of traffic-bearing channels according to varying traffic demands or the transmission quality in the radio telephony environment, e.g., U.S. Pat. Nos. 5,134,709, 5,235,631 and 5,276,908. In addition U.S. Pat. No. 4,868,811 discusses the protocol over the common signalling channel for allocation of traffic-bearing channels. U.S. Pat. No. 4,870,408 proposes a process of re-assigning subscriber units to balance the traffic load over the available channels. U.S. Pat. No. 5,010,329 discloses a method for dynamically grouping terminals in blocks for which the central unit performs block polling on a common data channel. The present invention presents a method to dynamically allocate both signalling data and traffic-bearing channels and to dynamically assign remote terminals to these channels.

The polling scheme is commonly used to resolve contention in a multiple access system. U.S. Pat. No. 4,385,314 proposes a system to sequentially poll all terminals. Due to the inherent inefficiency with sequential polling method, some proposals with the following variations for performance improvement have been presented. U.S. Pat. No. 4,754,426 proposes a two-level polling scheme with distributed control. U.S. Pat. No. 4,829,297 proposes use of a high priority group. U.S. Pat. No. 4,868,816 proposes a binary polling scheme, similar to the polling scheme in the present invention, with terminal address in each poll. U.S. Pat. No. 4,924,461 proposes a method to register other pending request on a second channel to interrupt sequential polling. U.S. Pat. No. 4,942,572 proposes a dual rate polling method using pseudo random sequence at high rate to poll all terminals resulting possibly in contention with a small number of terminals, and following the high rate poll by specific poll at lower rate in case of collision. This invention differs from the prior art in that multiple access is controlled through overlapping polling sequence executing on multiple channels in a parallel fashion. Only when collision occurs, this method will enter a selective polling sequence for contention resolution. The added benefit of this method is efficiency and redundancy against anomalies such as interference and component failure.

OBJECTS OF THE INVENTION

To overcome the problems mentioned above, the objective of the present invention is to present A flexible and extensible method for signalling channel management;

A flexible and extensible method for assigning remote terminals to the signalling channels;

An efficient asynchronous signalling protocol.

In the present invention, a dynamic process is disclosed to adjust the number of signalling channels to meet the requirements of varying traffic demand and the system growth. This is important in carrying multi-media traffic with different requirements in both the traffic-bearing channel bandwidth and the time required to setup a traffic-bearing channel. This dynamic signalling channel allocation and terminal assignment method also aids in system redundancy for anomalies such as interference and component failure. Integrated with the channel allocation and terminal assignment process, the present invention also presents an efficient controlled multiple access method. The central controller initiates the general polling on each signalling data channel in parallel to solicit request from all terminals assigned to the signalling data channel. Only when collision is detected, the central controller starts to poll selectively for resolution.

Further objects and advantages of my invention will become apparent from considerations of the drawings and ensuing description thereof.

BRIEF SUMMARY OF THE INVENTION

The multiple access communication system architecture depicted in FIG. 1 comprises a plurality of remote terminals, a common shared transmission media, a central controller and interface to wide area networks. There are provided a number of communication channels (L) to the wide area networks, a number of communication channels (M) for supporting a plurality of remote terminals (N). The M number of channels to support communication between the central controller and the remote terminals are separated into four categories as depicted in FIG. 2, for carrying signalling data and user traffic in the forward and reverse directions, i.e., forward signalling data or FD channel, forward traffic bearer or FB channel, reverse signalling data or RD channel, and reverse traffic bearer or RB channel. All communication signals between the central controller and the remote terminals are multiplexed onto the shared transmission media.

The remote terminals are equipment supporting the users' communication need and are distributed throughout the network. For simplicity reason, the summing device for signals from remote terminals are shown as a single device in FIG. 1. Each of the remote terminals has one RF data demodulator capable of receiving data on the assigned FD channel, one frequency agile receiver capable of tuning to the assigned FB channel, one RF data modulator capable of transmitting data on the assigned RD channel, and one frequency agile transmitter capable of tuning to the assigned RB channel. The central controller comprises a switch and control mechanism, and a pool of transmitters and receivers for the communication channels. The central controller provides concentration and control function to meet the communication demand of the remote terminals much the same way as a Private Automated Branch eXchange or PABX. The central controller also translates the signalling information according to the requirement of the network. There are two levels of concentrations provided with this system: contention in the shared transmission media via the signalling protocol, and through the switching matrix of the central controller.

The signalling channels are dynamically adjusted for efficiency and redundancy. This also adds to the extensibility of the system for the increasing traffic load and system growth. The downstream traffic on these channels are scheduled by the central controller. Multiple access of the remote terminals for the upstream traffic are mitigated by separating remote terminals in groups via the channel allocation and the terminal assignment process. Prompted by the remote terminals at startup, or through the failure recovery procedure, or deemed necessary by the central controller, the channel allocation and terminal assignment process are initiated and controlled by the central controller. Through the registration process, the central controller assigns the remote terminal to a group supported by coupling of the specific forward and reverse signalling data channels. Afterwards, the communication between the central controller and the remote terminals follows a two-phase process. The controlled multiple access method is used, on each forward signalling data channel in parallel, for sporadic user data transfer or signalling purpose. The central controller either sends command to a specific remote terminal or solicits requests via a general poll from remote terminals assigned to the forward signalling data channel. The remote terminals respond to the controller's poll to request services. The selective polling process is used to identify the remote terminals involved in case of collision. The traffic bearer channel is used once the circuit is established via signalling protocol over the signalling data channels. The controlled multiple access scheme using overlapping polling method represents an efficient asynchronous signalling method and the decision process is designed to improve the effectiveness of the selective polling coverage during the contention resolution process.

Accordingly the achieved benefits of the present invention are:

General communication channels management architecture;

Flexible and extensible scheme for signalling channel management;

Flexible and extensible scheme for assigning remote terminals to the signalling channels;

Flexible and extensible scheme for supporting system growth and new services requirements;

Improved system redundancy;

Efficient asynchronous signalling protocol.

BRIEF DESCRIPTION OF THE DRAWINGS

Other objects, features and advantages of the invention will be apparent from the following Description of the Preferred Embodiment taken together with the accompanying drawings in which:

FIG. 9 details the message format for the signalling protocol between the central controller and the remote terminals.

FIG. 13 contains signalling message exchange diagrams for comparison of two methods using the regular and the overlapping polling cycle.

DESCRIPTION OF PREFERRED EMBODIMENT

Figure 1:
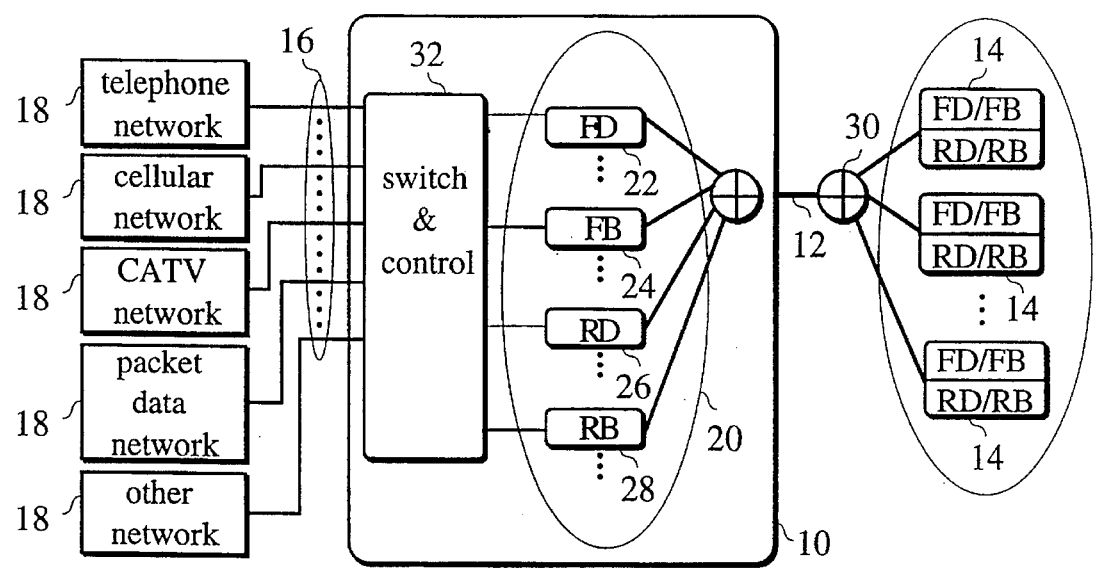
FIG. 1 is a illustration of a multiple access communication system architecture with interconnections between the remote terminals, the central controller which comprises the switch and control module and a number of transmitters and receivers, and the wide-area network.

The multiple access communication system architecture as depicted in FIG. 1 comprises a central controller 10, a shared transmission media 12, and plurality of remote terminals 14 dispersed geographically throughout the network. A pool of communication channels 16 (L) are provided to the wide area networks 18, a pool of communication channels 20 (M) for supporting a plurality of remote terminals 14 (N). The M number of channels to support communication between the central controller 10 and the remote terminals 1.4 are separated into four categories for carrying signalling data and user traffic in the forward and reverse directions, i.e., forward signalling data or FD channel 22, forward traffic bearer or FB channel 24, reverse signalling data or RD channel 26, and reverse traffic bearer or RB channel 28. All communication signals between the central controller 10 and the remote terminals 14 are multiplexed onto the shared transmission media 12. All remote terminals 14 are equipment supporting the users' communication need and are distributed throughout the network. For simplicity reason, the summing device 30 for signals from remote terminals are shown as a single device in FIG. 1. In a CATV network, this summing device 30 represents the splitters and taps connecting the branches that make up the network.

The central controller 10 comprises a switch and control mechanism 32, and a pool of transmitters, called forward signalling data channel (FD) 22 and forward traffic bearer channel (FB) 24, and a pool of receivers, called reverse signalling data channel (RD) 26 and reverse traffic bearer channel (RB) 28. The central controller provides concentration and control function to meet the communication demand of the remote terminals much the same way as a Private Automated Branch exchange or PABX. The central controller also translates the signalling information according to the requirement of the network. In addition to concentration provided through the switching matrix of the central controller, contention in the shared transmission media via the signalling protocol provides another level of concentration with this system.

Each of the remote terminals has one radio frequency (RF) agile data demodulator capable of receiving on the assigned FD channel 34, one RF agile receiver tuned to the assigned FB channel 36, one RF agile data modulator capable of transmitting on the assigned RD channel 38, and one RF agile transmitter tuned to the assigned RB channel 40.

Although the present invention is useful for interworking with a variety of different wide area networks, the telephone network will be used hereinafter to illustrate the present invention.

Figure 2:
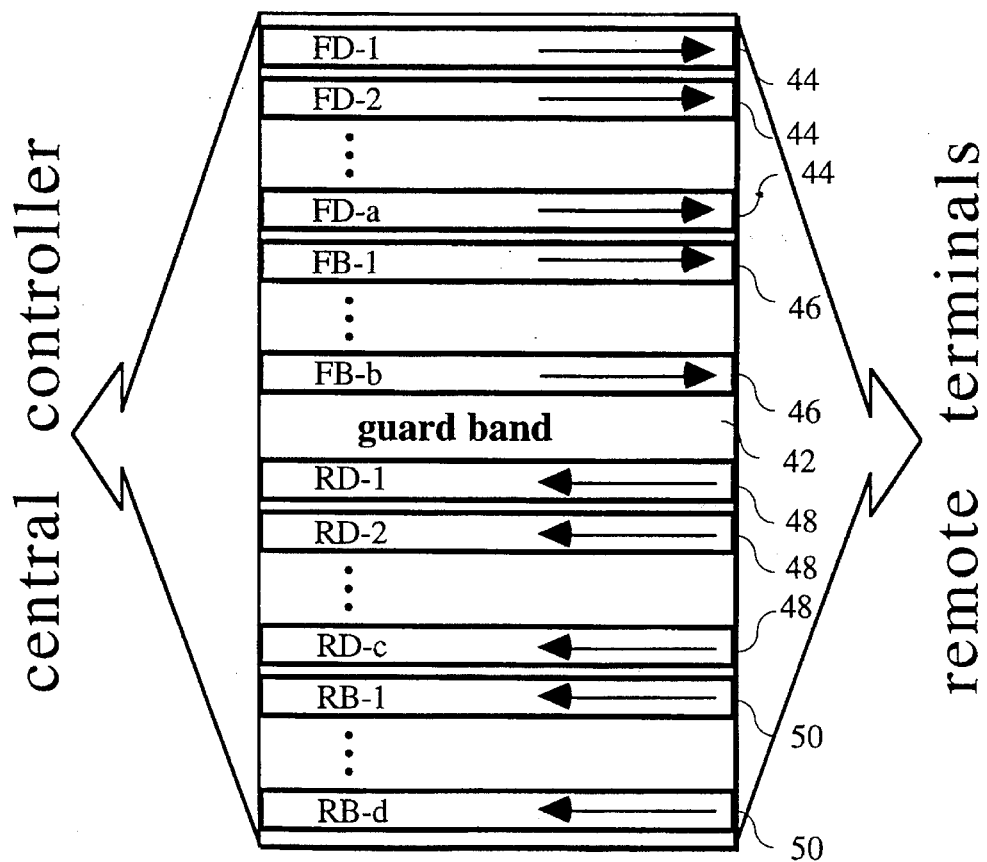
FIG. 2 shows the channelization of the communication bandwidth of the shared transmission media between the central controller and the remote terminals for different functions.

As depicted in FIG. 2, the bandwidth is channelized for carrying traffic in the forward and the reverse direction. Data channels are used for carrying signalling or data traffic while bearer channels are used for carrying user traffic similar to circuits in telephony. Therefore, there are altogether 4 types of channels as depicted in FIG. 2. FD-x is the signalling data channel in the forward direction 44, i.e., from the central controller to the remote terminals, numbered from 1 to a. FB-y is traffic bearer channel 46 in the forward direction numbered from 1 to b. RD-x' is signalling data channel 48 in the reverse direction, i.e., from the remote terminals to the central controller, numbered from 1 to c. RB-y' is traffic bearer channel 50 in the reverse direction numbered from 1 to d. A guard band 42 is also shown to separate the signals traveling in the forward and the reverse directions if they are to be put side-by-side. As explained later a and c should be greater than or equal to 2 for redundancy reason. Note that if the channels are of equal size, then a+b and c+d shall remain constant if all channels are available free of interference problem, i.e., there are a pool of channels from the central controller to the remote terminals, and a separate pool of channels from the remote terminals to the central controller. These pools are set aside for a flexible allocation scheme to be described in detail later.

Although it is not necessary to have all channel to have equal bandwidth, the communication process can be managed more easily if the channels have simplified structure with equal bandwidth. In case of equal size of the FD and FB channels, the management scheme can relocate the FD to a channel that is better suited for data transmission while FB channel carrying normal voice communication can tolerate a considerable more noisy channel than FD channel is able to. Similarly, the management process can take advantage of the flexibility afforded by the equal size of the RD and RB channels. If the bandwidth of the communication channels to the wide area network is equivalent to the channels of the shared transmission media, the number L is less than or equal to the number M, which in turn is less than or equal to the number N. In case of channels with different sizes the central controller needs to have the additional intelligence for managing these channels efficiently, and to perform segmentation and reassembly. Note that communication with asymmetric bandwidth requirement such as multi-cast can be efficiently supported in this system.

The FB-y and RB-y' channels are allocated according to the signalling protocol communicated over the FD-x and RD-x' channels. There is no contention in the forward direction, i.e., the traffic on each FD-x channel is scheduled independently. The number of signalling data channels are used to improve the efficiency servicing groups of remote terminals and the system redundancy. In case of transmission failure (detected through a number of retries without receiving acknowledgment), the central controller reverts back to FD-1 and then FD-2 for transmission to the specific remote terminal, while the remote terminals reverts back to RD-1 and then RD-2 for transmission and to FD-1 and FD-2 for reception. The FD-1 and FD-2 channels are called primary forward signalling data channel and backup forward signalling data channel respectively. These RD-1 and RD-2 channels are called primary reverse signalling data channel and backup reverse signalling data channel respectively.

With this general channelization architecture, a flexible management scheme is possible for channel arrangement and remote terminals grouping. For example, channel arrangement can be adjusted according to traffic pattern mix and/or more intelligent management scheme can be implemented with various priority lists. The channelization is shown to follow a FDMA scheme for ease of understanding, but this can also be easily adopted for TDMA or CDMA schemes.

Multiple access of the remote terminals for the upstream traffic are mitigated by separating remote terminals in groups via the channel allocation and the terminal assignment process to be described later. The contention among remote terminals in each group is resolved through a controlled multiple access followed by selective polling in case of collision on each of the signalling data channel. The number of remote terminals assigned to each of the RD channel is to be evenly distributed according to the traffic demand. In the case of identical traffic requirements from all users, the number of remote terminals assigned to each of the RD channel will be equal.

Figure 3A:
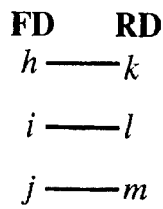
FIG. 3 depicts the possible mappings of forward and reverse signalling data channels.
Figure 3B:
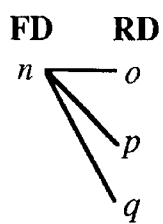
Figure 3C:
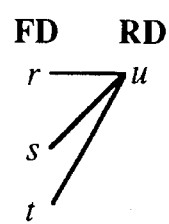

The mapping of forward and reverse signalling data channels is under the control of the central controller dynamically. The mapping of part (a) of FIG. 3 depicts the simplest arrangement with each pair of forward and reverse signalling data channels forming a terminal group. For example, the terminal group receiving on FD-h channel will transmit on RD-k. The part (b) depicts the one-to-many mapping where the central controller transmits on one FD-n channel while the remote terminals belonging to the same group respond in their assigned RD-o, RD-p, and RD-q channel respectively. In part (c) with the many-to-one mapping shows that the central controller transmits on several FD (r, s and t) channels each reaching a subset of the group of the remote terminals, which respond in the same RD-u channel. Depending on the traffic pattern, some mapping will be more efficient in utilizing the bandwidth, e.g., the many-to-one mapping as depicted in part (b) of FIG. 3 is suitable for case where the traffic coming from the remote terminals far exceeds the traffic in the forward direction. Note that the mapping of part (c) can cause collision from remote terminals in different sub-sets of the same terminal group. This is the only mapping that will require the contention resolution process, described later, to be coordinated between multiple signalling data channels. Different types of mapping can be used at the same time (but not combined) for different segments of remote terminals when deemed appropriate by the central controller.

Prompted by the remote terminals at startup, or through the failure recovery procedure, or deemed necessary by the central controller, the channel allocation and terminal assignment process is initiated and controlled by the central controller. Through the registration process, the central controller assigns the remote terminal to a group corresponding to a specific set of signalling data channels. Afterwards, the communication between the central controller and the remote terminals follows a two-phase process. The controlled multiple access procedure is used on each of the signalling data channels in parallel, for sporadic user data transfer and for signalling purposes. The controller sends command to the remote terminal in case of request from the network while the remote terminals respond to the controller's poll to request services. If dedicated channel is required to meet the user's need, the traffic bearer channel is established via signalling protocol over the signalling data channels.

Figure 4:
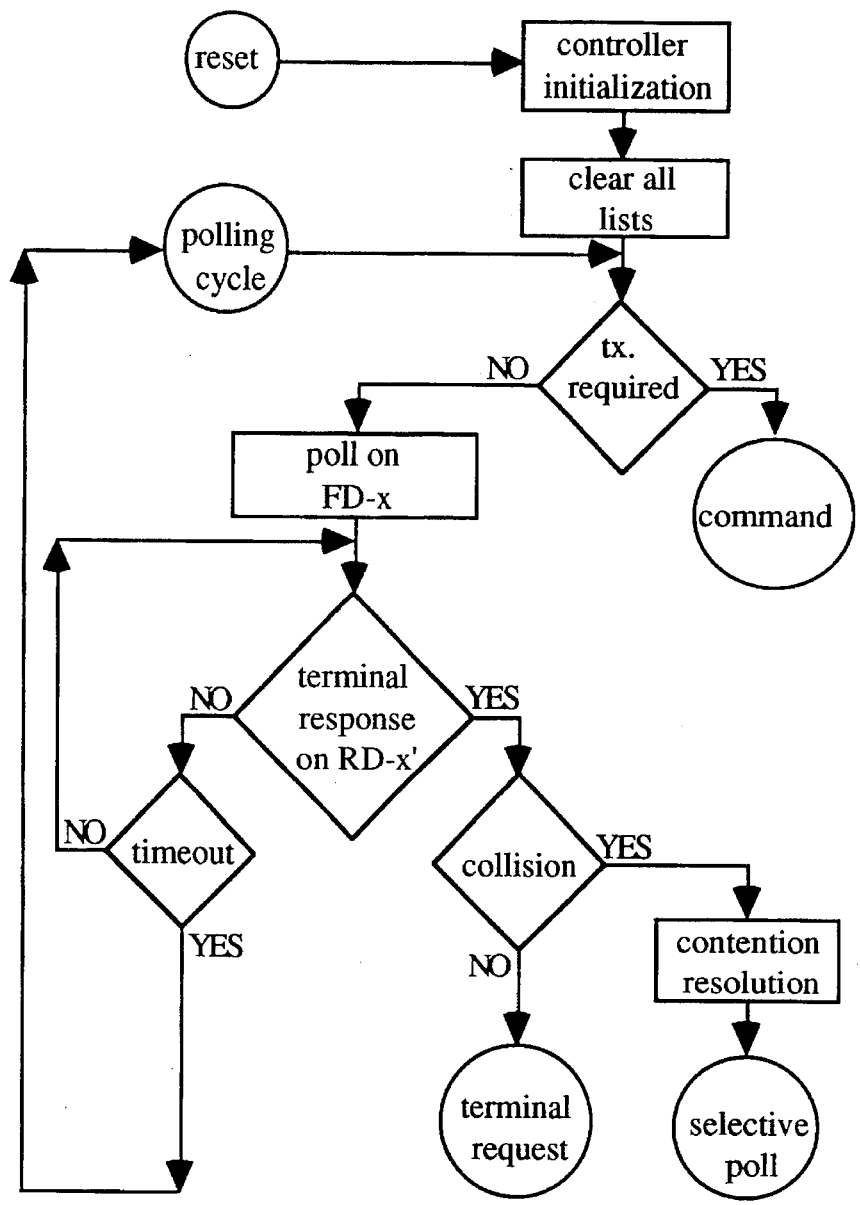
FIG. 4 depicts the logic flow diagram for polling and registration process at the central controller.

In FIG. 4, the logic flow is shown for the central controller's initialization process and polling cycle. The polling process is executed in parallel for each of the FD-x in an independent fashion. After the system initialization, the central controller clears the channel allocation and terminal assignment lists and starts the polling cycle on FD-1 and FD-2. If there is required transmission to the remote terminal, such as a incoming call, the central controller enters the command mode. Otherwise the central controller solicits for request from remote terminals assigned to the FD channel via a general poll. If there is no response from any of the remote terminal, the polling cycle repeats after a time-out period expires. If there is response from remote terminals without collision or transmission error, the central controller processes the request accordingly. In case of collision or transmission error, the central controller enters a selective polling cycle to identify the remote terminal(s) involved in the collision or caused the transmission error.

Figure 5:
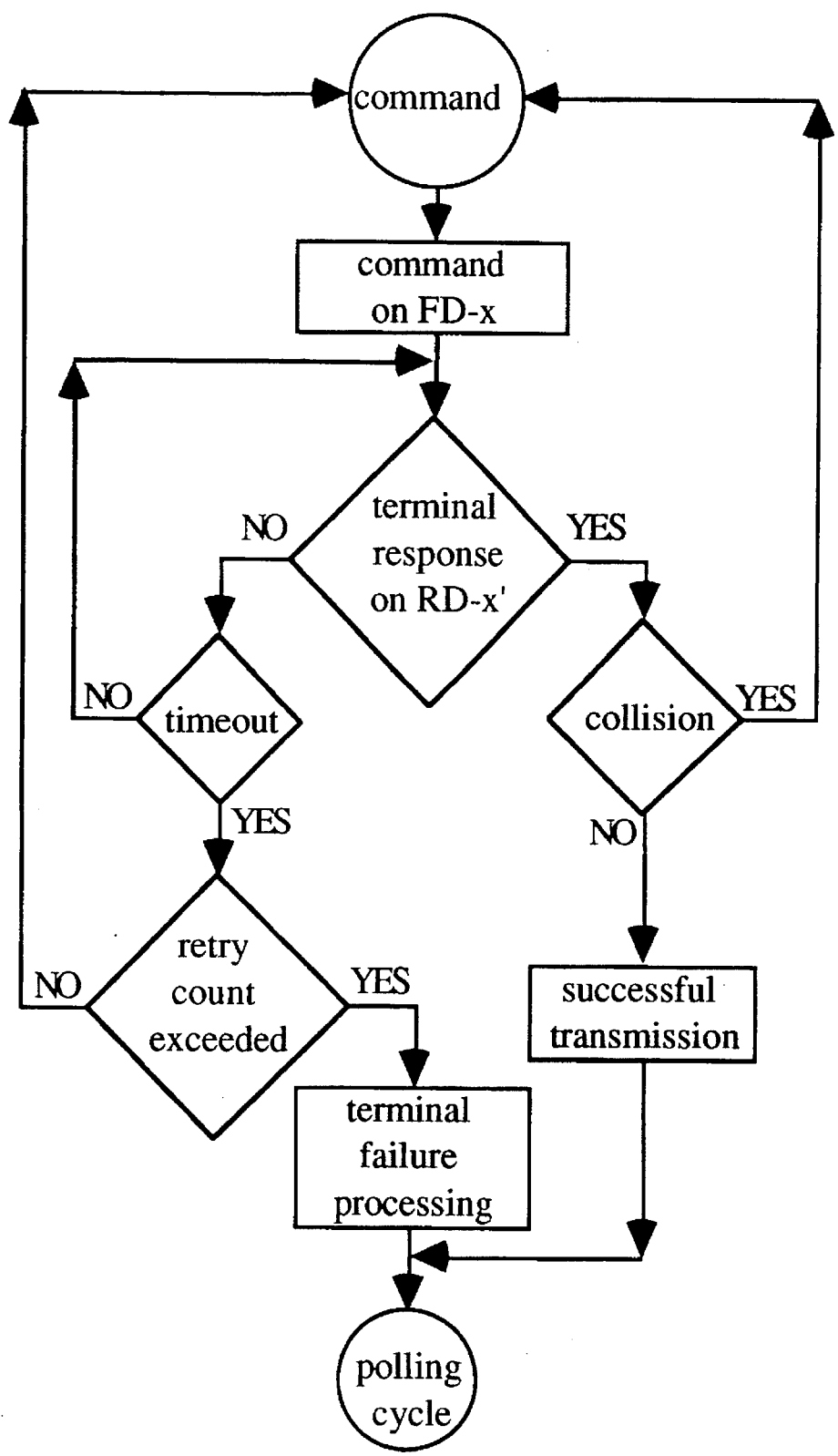
FIG. 5 depicts the logic flow diagram for command process at the central controller.

As depicted in FIG. 5, the central controller in the command mode sends the message destined for a specific remote terminal. Normally only the addressed remote terminal will respond to the command, therefore, there is normally no need for collision processing except for transmission error. If the expected response is not received at the central controller from the addressed terminal after the time-out period expires, the central controller assumes that either FD-x or RD-x' channel is not usable by the addressed remote terminal. In this case, the central controller retries for a number of times, then proceeds with the terminal failure processing if there is still no response from the specific remote terminal. The terminal failure processing removes the failed remote terminal from the group and signals to the wide area network that connection is not possible.

Figure 6:
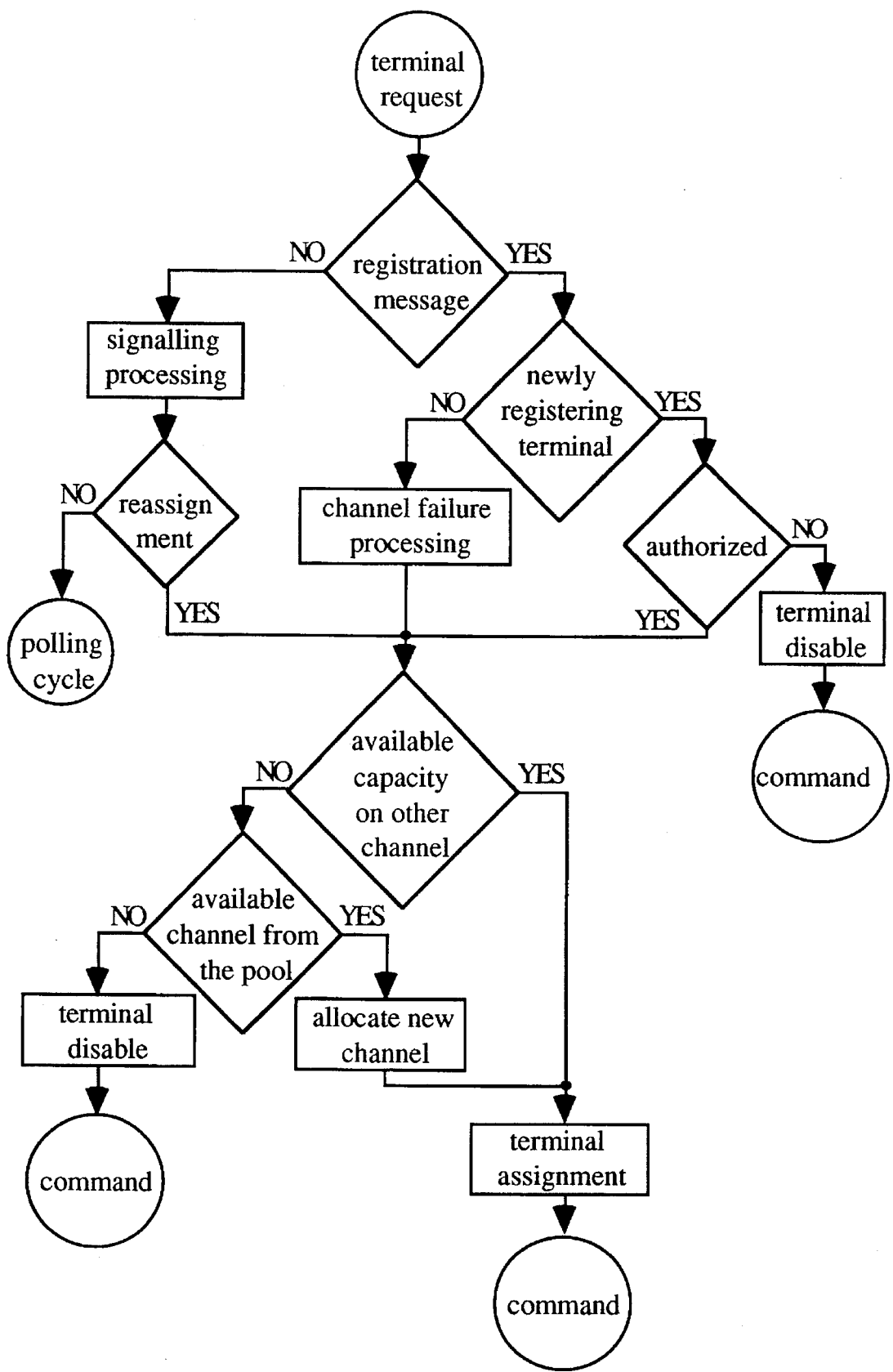
FIG. 6 is the logic flow diagram for registration, terminal reassignment, channel allocation, and terminal assignment process at the central controller.

In FIG. 6, the logic flow diagram for the registration, channel allocation, terminal assignment and reassignment process is depicted. Upon receiving a registration message on RD-1 or RD-2, the central controller checks if the remote terminal is a newly registering terminal. If the remote terminal is a newly registering terminal and is authorized, the central controller proceeds to check for available signalling data channels for the remote terminal. If the new remote terminal has not been authorized, the central controller will deny the remote terminal from entering the network by issuing a terminal disable command. If the remote terminal has been registered previously, the registration process is caused by channel failure recovery procedure sensed at the remote terminal, and the central controller will register the channel status and proceed to check for available signalling data channels for the remote terminal. At any time, the central controller can initiate the terminal re-assignment process if deemed appropriate for the varying traffic demand or other system dynamics.

The determining factors of signalling data channels availability include the number of remote terminals using the signalling data channel, the traffic requirements, past collision count, channel error status, and bandwidth of the signalling data channel. These factors will be calculated for each of the existing signalling data channels in consideration of the specific group mapping as depicted in FIG. 3. If there are signalling data channels in the forward and the reverse direction, the registering remote terminal will be assigned to the group. If there is no available signalling data channel already in use, the central controller will check for available channel from the pool of transmitters and/or the poll of receivers, and proceeds with allocation if there is available channel from the pool (or a pair in case that neither the forward nor the reverse signalling data channels are available). If the signalling data channel is available, the central controller will complete the registration process by commanding the remote terminal to tune to the assigned channels. Otherwise, the central controller will deny the remote terminal from entering the network by issuing a terminal disable command.

Figure 7:
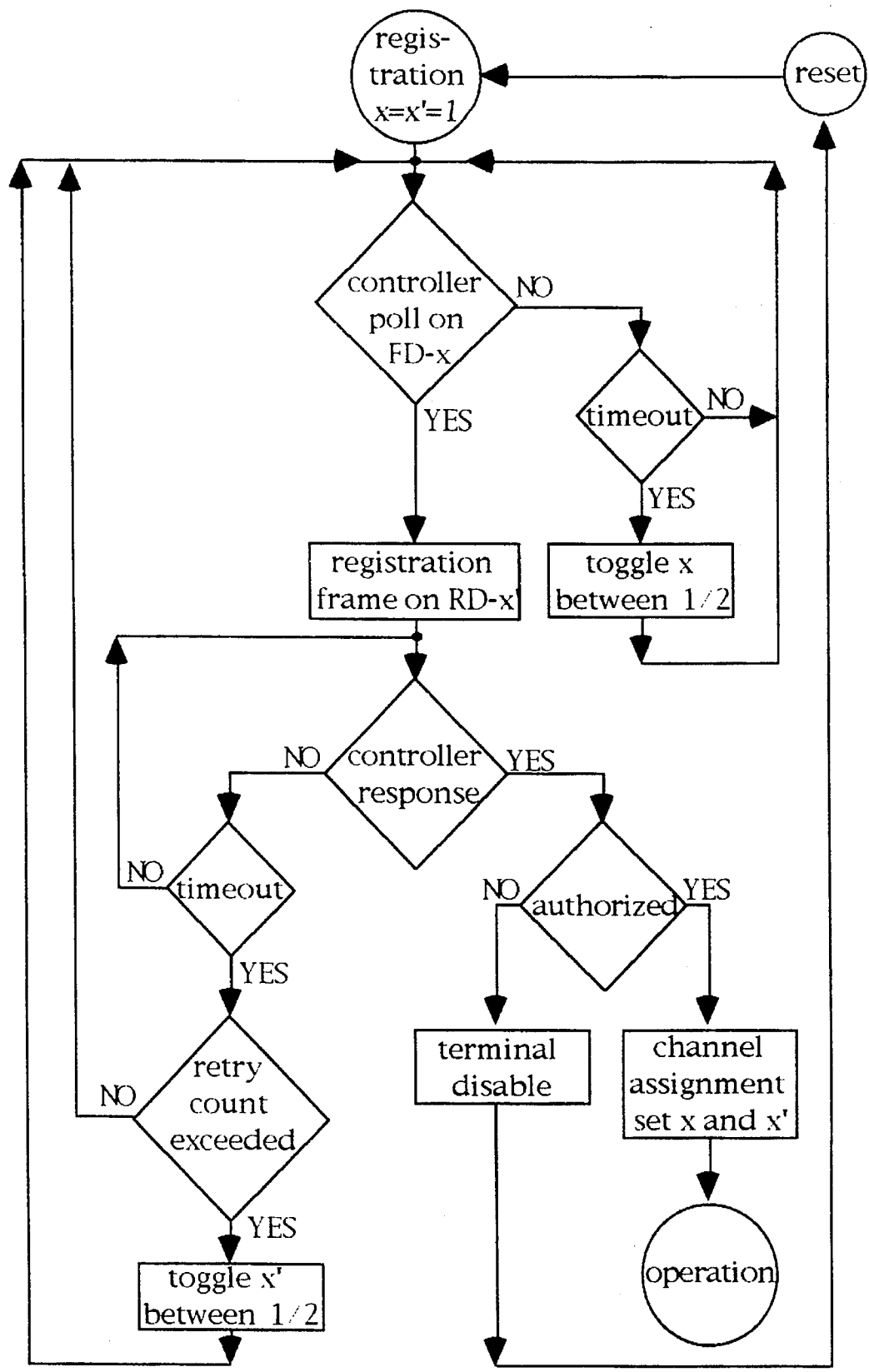
FIG. 7 depicts the logic flow diagram for registration process at the remote terminals.

In FIG. 7, the logic flow of the remote terminals is shown for the channel registration process at startup or through failure recovery procedure. All of the remote terminals assigned to the same forward signalling data channel will receive the command or poll, but only the addressed remote terminals should respond. Initially the remote terminals will listen to a general poll on FD-1 for registration. If the poll from the central controller is not receiving for an extended period of time, the remote terminal will try FD-2 channel (toggling between FD-1 and FD-2). Once a general poll is sensed on the forward signalling data channel, the remote terminal responds first on RD-1 and then RD-2 if there has not been an acknowledgment from the central controller when the time-out period expires and retry count exceeded. Based on the central controller's command in response to the remoter terminal's registration message, the remote terminal either tunes to the assigned FD and RD channels or disables itself if not authorized.

Figure 8:
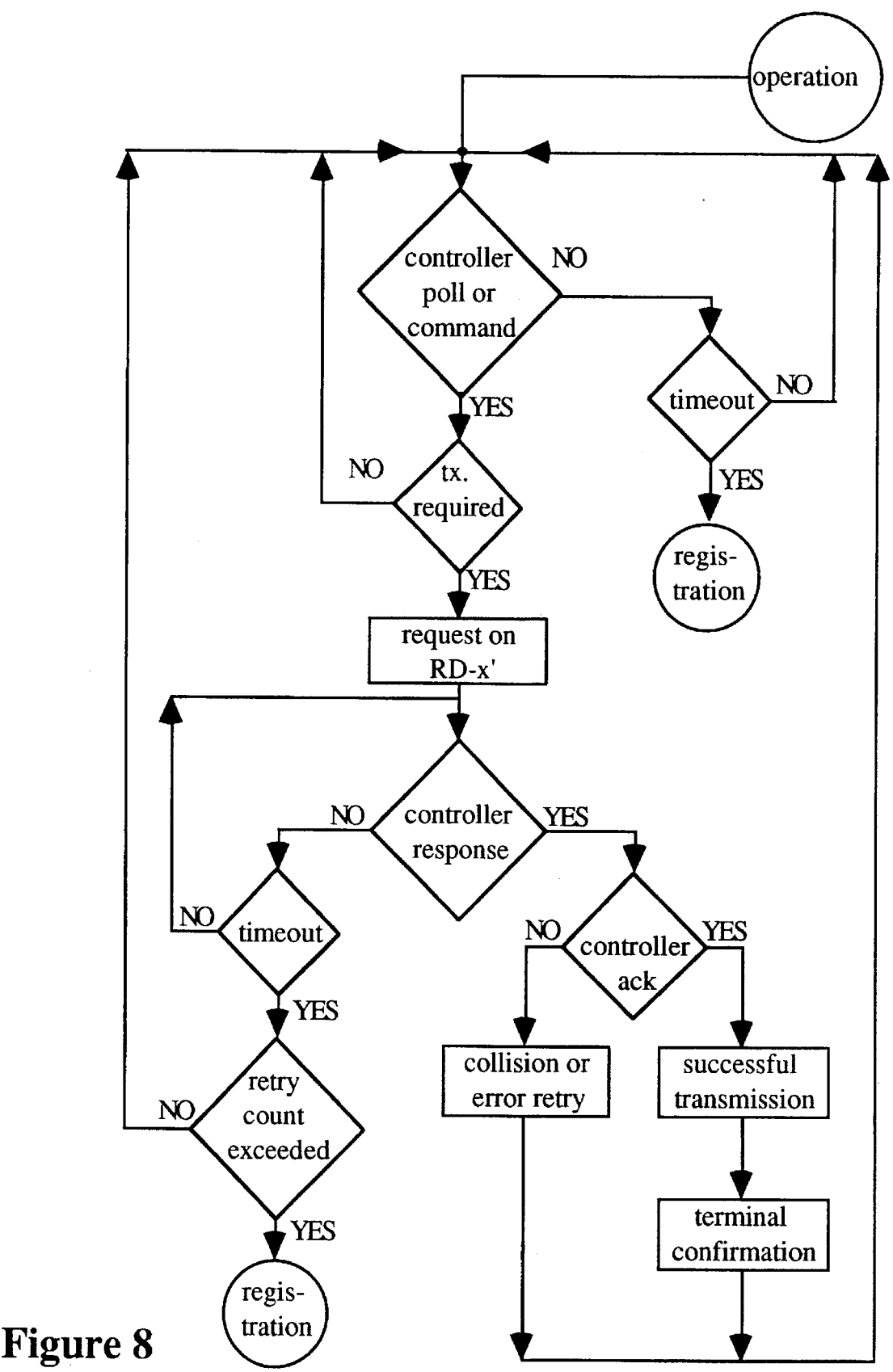
FIG. 8 depicts the logic flow diagram for signalling process at the remote terminals.

Depicted in FIG. 8 is the signalling process at the remote terminals. Once the registration process is completed, the remote terminal will monitor the poll or command from the central controller on the assigned FD-x channel, and respond on the assigned RD-x' channel if needed. In case of failure, i.e., not receiving polls from the central controller for extended period of time, or no acknowledgment for the previous request, the remote terminal reverts back to FD-1 and RD-1 via the registration process. In case of collision with other remote terminals, the remote terminal follows the instruction from the central controller through selective polling process to resolve the contention.

The message format of the signalling protocol between the central controller and the remote terminals is depicted in FIG. 9. The message frame starts with a one (1) byte preamble to indicate the start of message and to help detect collision. The Terminal Identifier (TID) field is one (1) byte long offering 256 possibility with the number 255 and 0 (hexadecimal FF and 00) set aside for registration purpose, i.e., maximum of 256−2=254 stations can be supported for each terminal group in this system.

The following field SAT or Signalling Action Type is three (3) bytes in length containing one of the listed commands. The SRT or Signalling Request Type field is also three (3) bytes in length containing one of the listed requests. Some of the commands and requests are included to illustrate possible features that can be supported in the system. For registration process, SAT and SRT fields contain the serial number of the remoter terminal, i.e., there are up to $2^{24}$=16 million possible numbers. Note that there are two different types of polling message. The selective polling with collision alert is used to alert other remote terminals to avoid using the channel where collision occurred until the resolution is completed. The lower TID of the range in the TID field and the higher TID of the range as part of the SAT field determine the type of the poll: specific, selective, or general. The FCS or Frame Check Sequence field is one (1) byte long for protection against transmission error in the TID and SAT/SRT fields.

Collision and transmission error are detected by the following mechanisms:

invalid TID,

FCS error, invalid frame length, invalid frame format, invalid SAT/SRT value.

Figure 10:
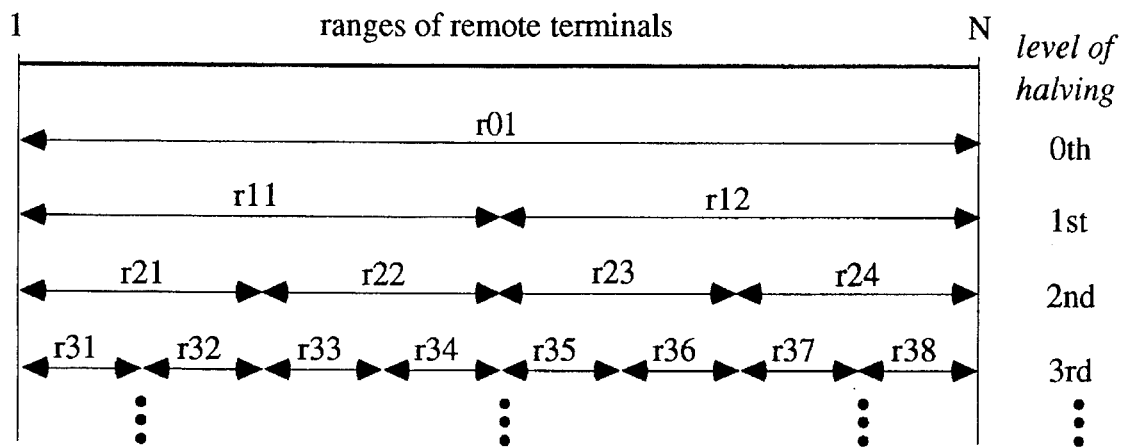
FIG. 10 shows the ranges of remote terminals for selective polling during the contention resolution process.

In FIG. 10, the remote terminals assigned to the same group are further separated in ranges during the selective polling process for resolving contention. This logic for resolving contention is contained in the central controller while the remote terminals follows the central controller's instructions. The naming of these ranges is as follows: the first digit of the subscript stands for the level, and the following number is used to sequentially designate from lower to higher TID (there are $2^n$ divisions at the n-th level). For example, at the 2nd level there are $2^2$=4 ranges named $r_{21}$, $r_{22}$, $r_{23}$, and $r_{24}$. Note that a selective poll with range $r_{01}$ is equivalent to a general poll.

Figure 11:
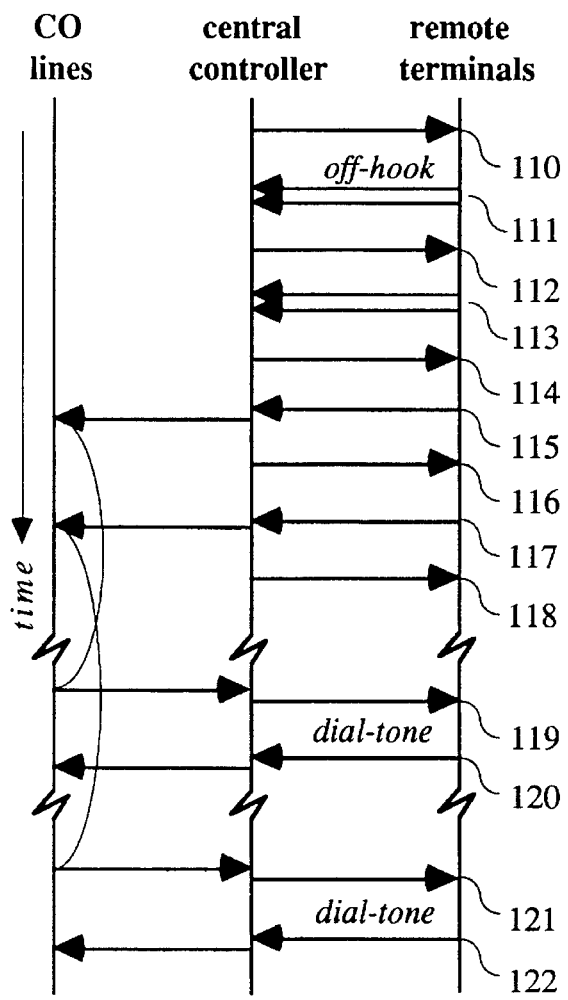
FIG. 11 is a message exchange diagram for signalling protocol between the central controller and the remote terminals illustrating a scenario of collision and its resolution.

In FIG. 11, a scenario of message collision and the resolution process is illustrated. The collision is resolved using the selective polling approach which is similar in spirit to the binary search algorithm. Suppose there are N number of remote terminals in total, and two remote terminals, one numbered between 1 and N/4 and the other numbered between N/4 and N/2, go off-hook during the same polling cycle. These two remote terminals will respond to the general poll from the central controller 110 resulting in a collision 111. Once the collision from two remote terminals is detected at the central controller, the next poll with collision alert covers the range $r_{11}$ between 1 and N/2 112, which results in another collision 113. After halving the range to $r_{21}$ between 1 and N/4 114, the remote terminal numbered between 1 and N/4 responds without interference 115. As soon as the first remote terminal involved in the collision is identified, the resolution process is deemed completed by the central controller. The central controller follows with a general poll without alert 116 that indicates the end of the contention resolution process and results in a response from the remote terminal in the range $r_{22}$ between N/4 and N/2 117. The next general poll 118 from the central controller resumes normal operation. The dial tone is generated at the remote terminal when connection to the network is established. The central controller sends commands 119 121 to these two remote terminals respectively, and the remote terminals respond to the commands from the central controller with confirmations 120 122.

Figure 12A:
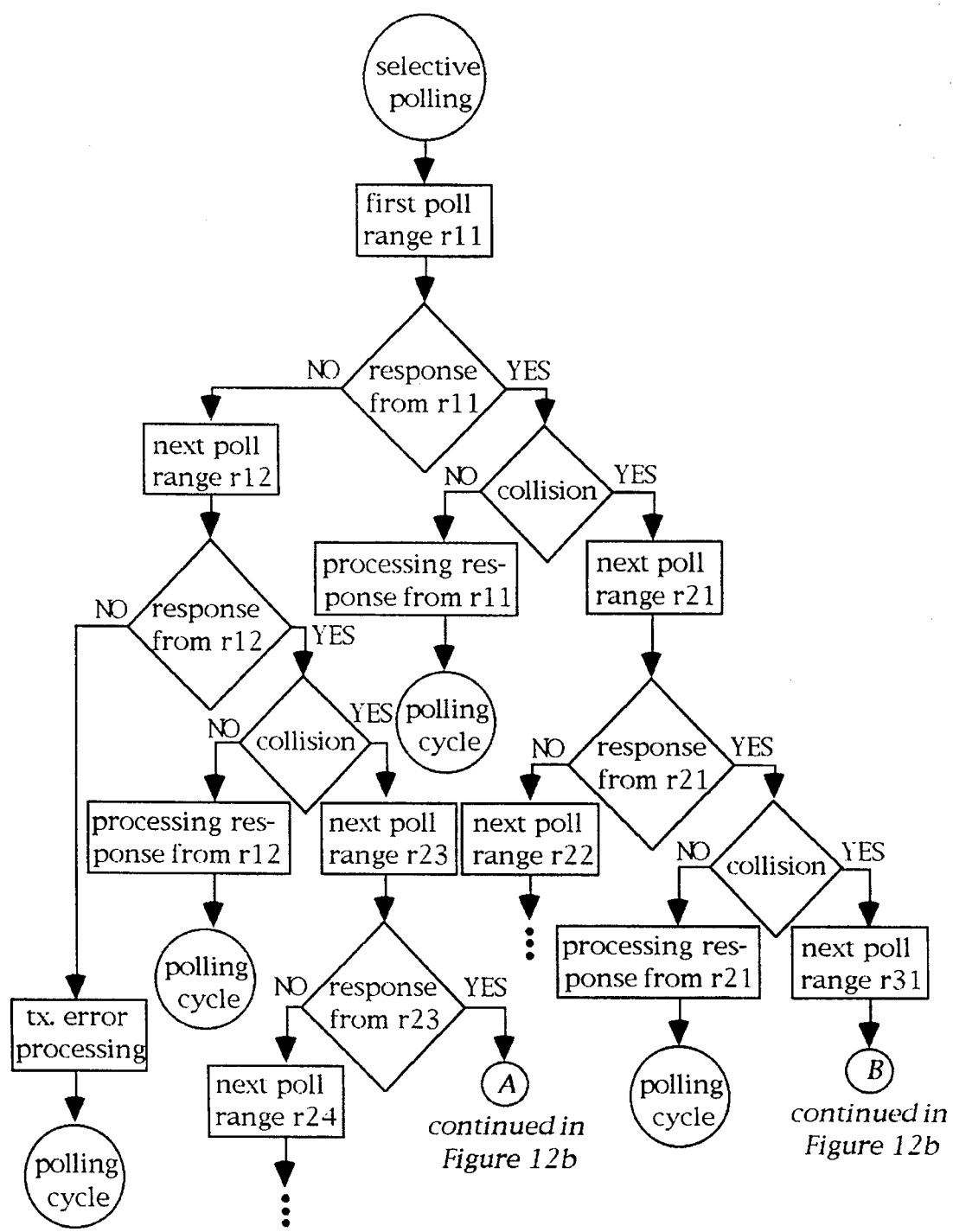
FIG. 12 is the decision graph for contention resolution process using polling ranges as defined in FIG. 10 using the regular polling method.
Figure 12B:
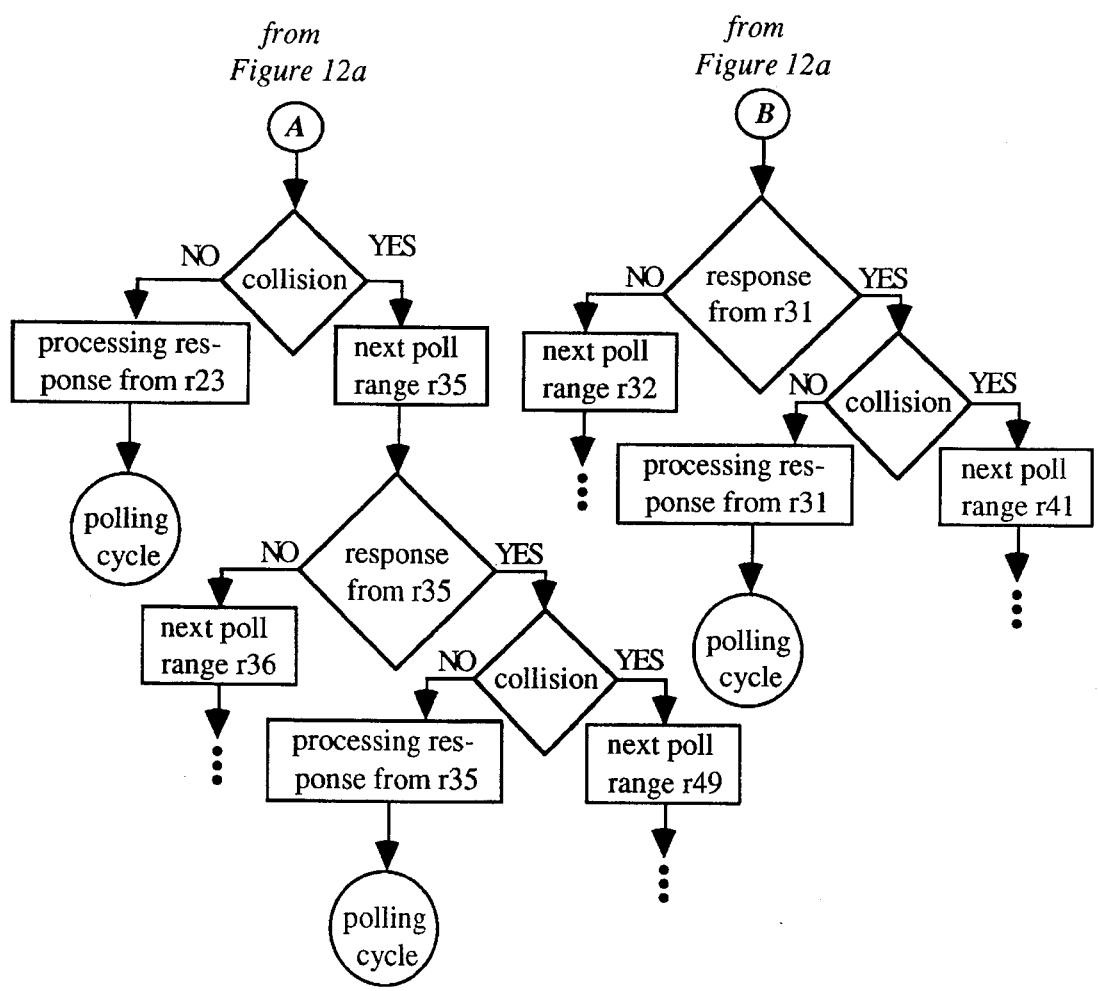

The decision tree is depicted in FIG. 12a and FIG. 12b for the selective polling process to determine the remote terminal(s) involved in the collision or caused the transmission error. This diagram is to illustrate the process involved using the regular polling method with which the polling cycle repeats only after the response to the previous poll is received or time-out occurs. The idea is to systematically narrowing the scope based on the information available. This systematic approach follows the level as defined in FIG. 10, i.e., orderly halving similar in spirit to the binary search algorithm.

Note that the contention process is deemed completed as soon as the first remote terminal involved in the collision is identified. Depending on the probability of the number of remote terminals involved in a collision and the error rate for the shared transmission media, i.e., if the transmission media has a high error rate and low collision probability, it is more beneficial to resume polling all remote terminals since the resolution process also accounts for the problem caused by transmission error. On the other hand if the collision probability is high and the transmission media is reliable, it is more efficient to continue the selective polling process until all remote terminals involved in the collision are identified.

Assume using the modest means of data transmission at rate of 9600 bits per second, to transmit 48 bits message the transmission delay T is approximately 48/9600=5 milliseconds. In the following discussion, assume 2.5 T is used for the time-out period for each polling cycle. The remote terminals shall start transmitting response message within the window of 0.5 T upon receiving the poll or the command from the central controller. One of the major benefit of fixed length messages is that it helps putting the time roughly into slots for efficiency improvement as explained in detail later.

To support 250 remote terminals in the system, the sequential polling scheme will incur the nominal delay of 250×2.5 T÷2=1.5625 seconds, which is too long to be acceptable for most services. With the controlled multiple access method, the remote terminal will gain access at the earliest poll with T/2 delay on average, and in case of collision the number of selective polling cycles required to identify the first remote terminal involved in the collision is $\log_2 250+1>9$, therefore, the maximum delay for the first terminal involved in a collision is $9\times 2.5\,T\times 22.5\,T=112.5$ ms. If the decision tree in FIG. 12 is adhered to, i.e., the central controller declares the contention resolution is completed as soon as the first remote terminal is identified, the second terminal involved in the collision will take twice the amount of time and the third one takes three times the amount of time and so on, until the last one which takes one poll only. More importantly this method guarantees a deterministic approach if the grouping of remote terminals are properly selected to reduce the probability of collision. If the grouping is not done properly, the effect of increasing number of multiple collisions will put the system in constant mode of contention resolution.

With transmitting and receiving in two separate paths, it is possible to initiate a separate poll or command instead of waiting for the response from the remote terminals to the outstanding poll. This overlapping polling method deviates from the regular polling method by interleaving poll with response to the previous poll thereby taking full advantage of the bandwidth available. Similar to the spirit of instruction pipe-lining in the computer processor architecture, some of the polls may not be productive in the case of collision as evident by the example in FIG. 15 later, however, these polls do not cause any adverse effect. The central controller needs to make correlation between the poll and the response, and tries to optimize the time in resolution by anticipating the most profitable steps to take next.

In FIG. 13, the message exchange diagrams of signalling protocols employing the regular polling cycle in FIG. 13a and the overlapping polling cycle in FIG. 13b are shown for comparison. In the ideal case with no collision, the controlled multiple access scheme using overlapping polling cycle represents an efficient asynchronous signalling method. In part (a) there are 3 polling cycles (response from remote terminal 130 to poll from the central controller 132) within the time frame using the regular polling method versus 6 polling cycles using the overlapping polling method as shown in part (b). This example shows the maximum efficiency improvement that can be derived from the overlapping polling method over the regular polling method, i.e., in the order of 2.

Figure 14A:
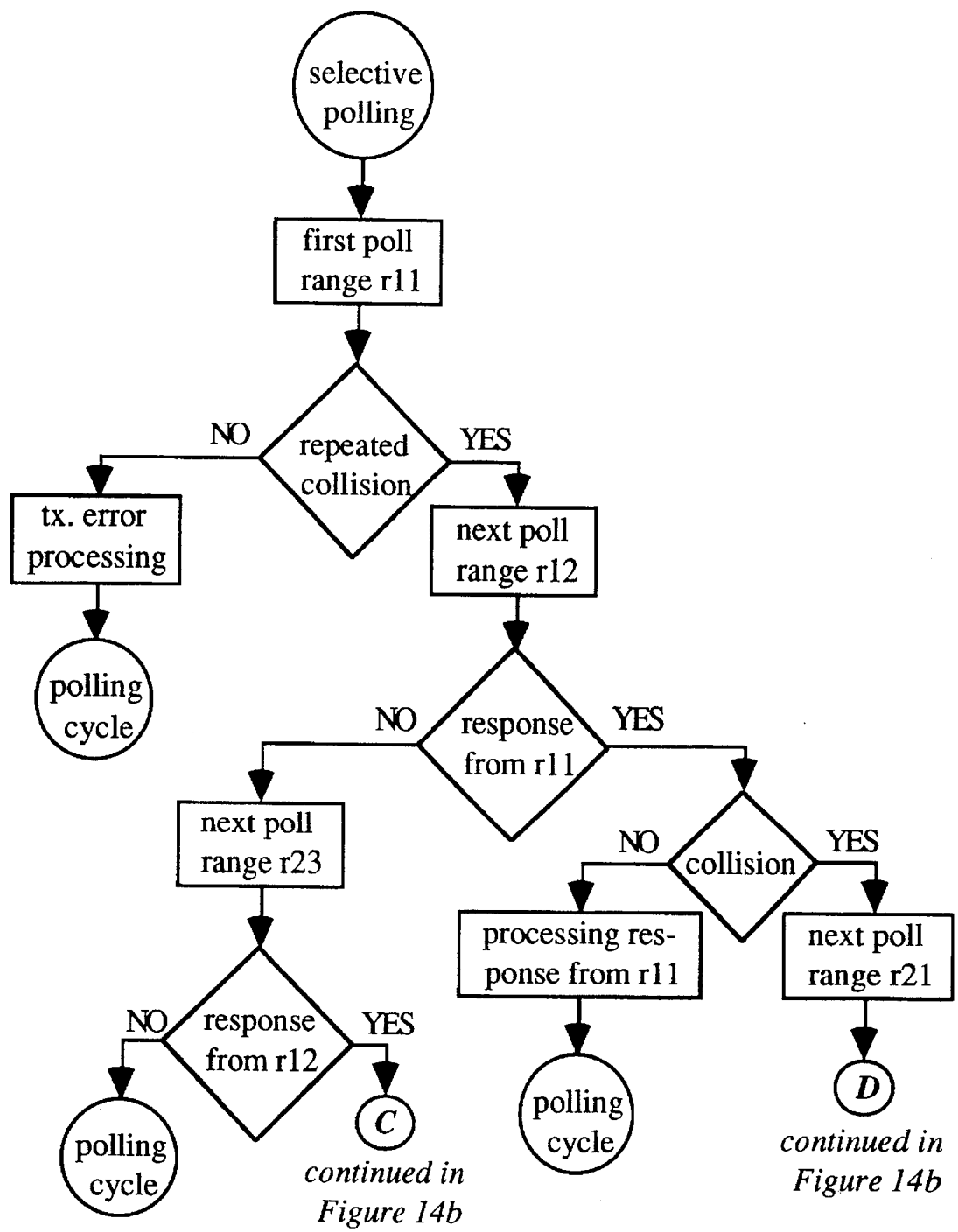
FIG. 14 is the decision graph for contention resolution process using polling ranges as defined in FIG. 10 using the overlapping polling method.
Figure 14B:
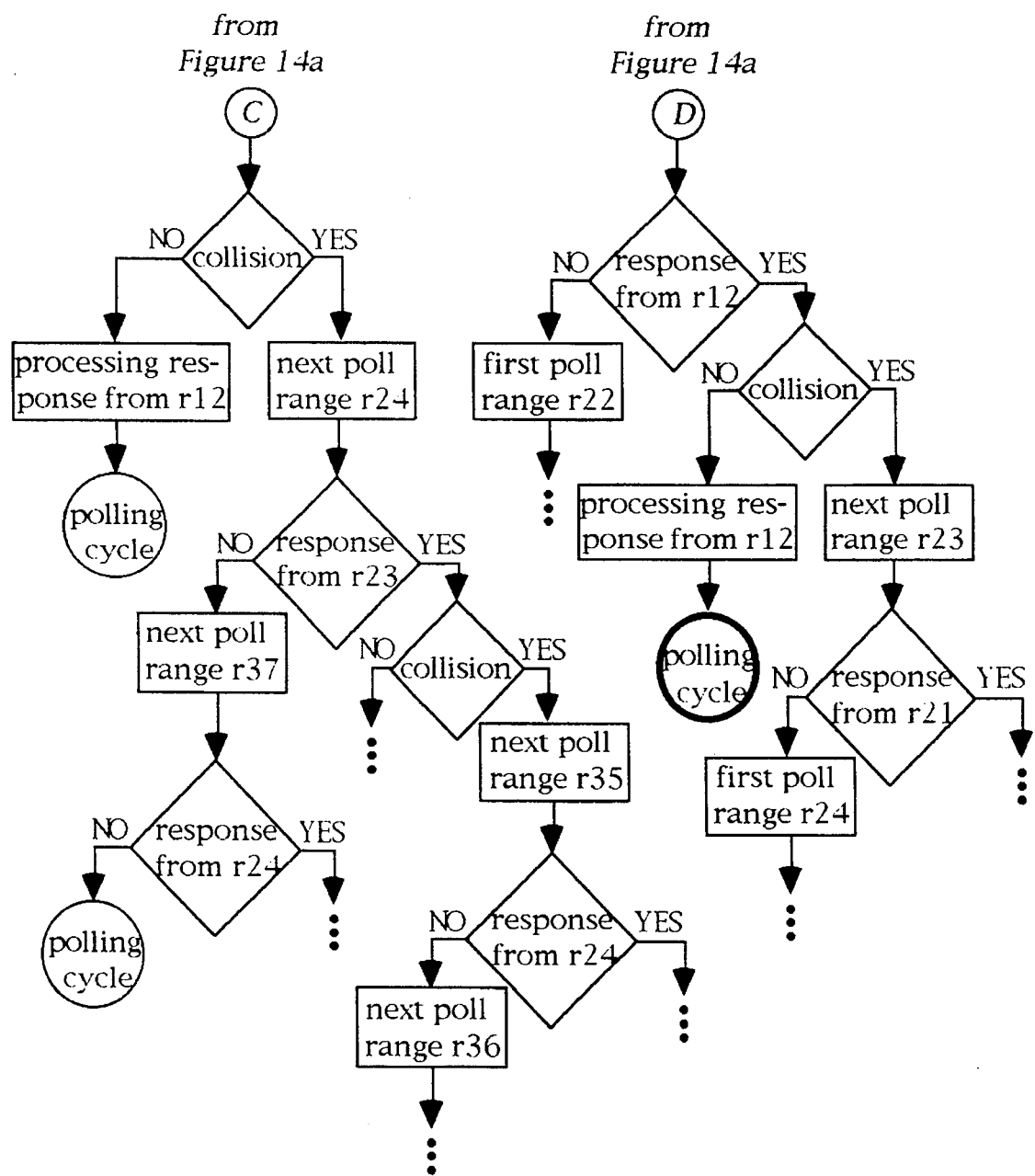

The decision tree is depicted in FIG. 14a and FIG. 14b for the selective polling process using the overlapping polling method to identify the remote terminal involved in the collision or caused the transmission error. The idea is to systematically narrowing the scope based on the information available and guided by the ranges of remote terminals at each advancing level as defined in FIG. 10. Taking the advantage of the overlapping polling cycle, the polls is designed to anticipate the most probable range for maximum effect. The repeated collision in response to the overlapped general poll is used to determine whether the corrupted message is caused by the transmission error or collision. Similar to the decision tree in FIG. 12, the resolution process is deemed complete as soon as the first remote terminal involved in the collision is identified.

Figure 15:
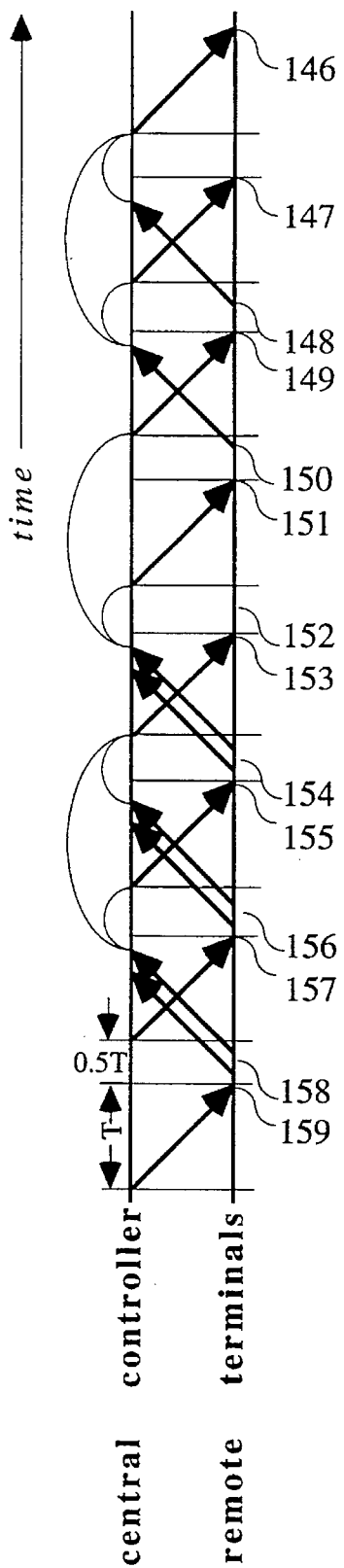
FIG. 15 is a message exchange diagram using the overlapping polling method for signalling protocol between the central controller and the remote terminals illustrating a scenario of collision and its resolution.

In FIG. 15, the message exchange diagram of the signalling protocol employing overlapping polling method dealing with the same scenario of collision as shown in FIG. 11 where the regular polling method is employed instead. Both remote terminals respond to the general poll from the central controller 159 resulting in a collision 158. Since the central controller sends another general poll without waiting for response from the remote terminals 157, both remote terminals respond again resulting in repeated collision 156. The central controller next probe the remote terminals in the range $r_{11}$ 155 resulting in second collision 154. The central controller also sends out another probe with a selective poll for remote terminals in the range $r_{12}$ 153 resulting in no response from these remote terminals 152. When the central controller polls the remote terminals in the range $r_{21}$ 151, one of the terminals involved in the collision succeeds in responding to the poll without collision 150. When the central controller polls the remote terminals in the range $r_{22}$ 149, the other terminal involved in the collision succeeds in responding to the poll without collision 148. At this point, the central controller sends out general poll without alert 147 to end the collision processing. The next general poll without alert 146 from the central controller resumes the normal operation.

It takes the same amount of time (2 polling cycles in real time) to identify the first remote terminal involved in the collision for both methods. A number of reasons contribute to this situation. There are a few wasted effort as shown in the diagram, such as the repeated collision 156, poll of remote terminals in the range $r_{12}$ 153, and poll of remote terminals in the range $r_{11}$ 155. Similar to the pipe-lining instruction architecture, this method is most productive when there is no "jump" in the line of instructions, i.e., no collision among the remote terminals. There are certainly instances where this method will produce more benefit than what is shown in FIG. 15. For example, the overlapping polling method will be able to identify the transmission error in 1.5 polling cycle versus 3 in the worst case for the regular polling method. The decision tree in FIG. 14 can also be modified to take advantage of the available information that there might be more than 2 remote terminals involved in a collision at various points, e.g., the thickened circle to resume the polling cycle on the right side of FIG. 14 can be extended to improve the efficiency in case of three remote terminals in ranges $r_{12}$, $r_{21}$ and $r_{22}$ involved in a collision.

Figure 16:
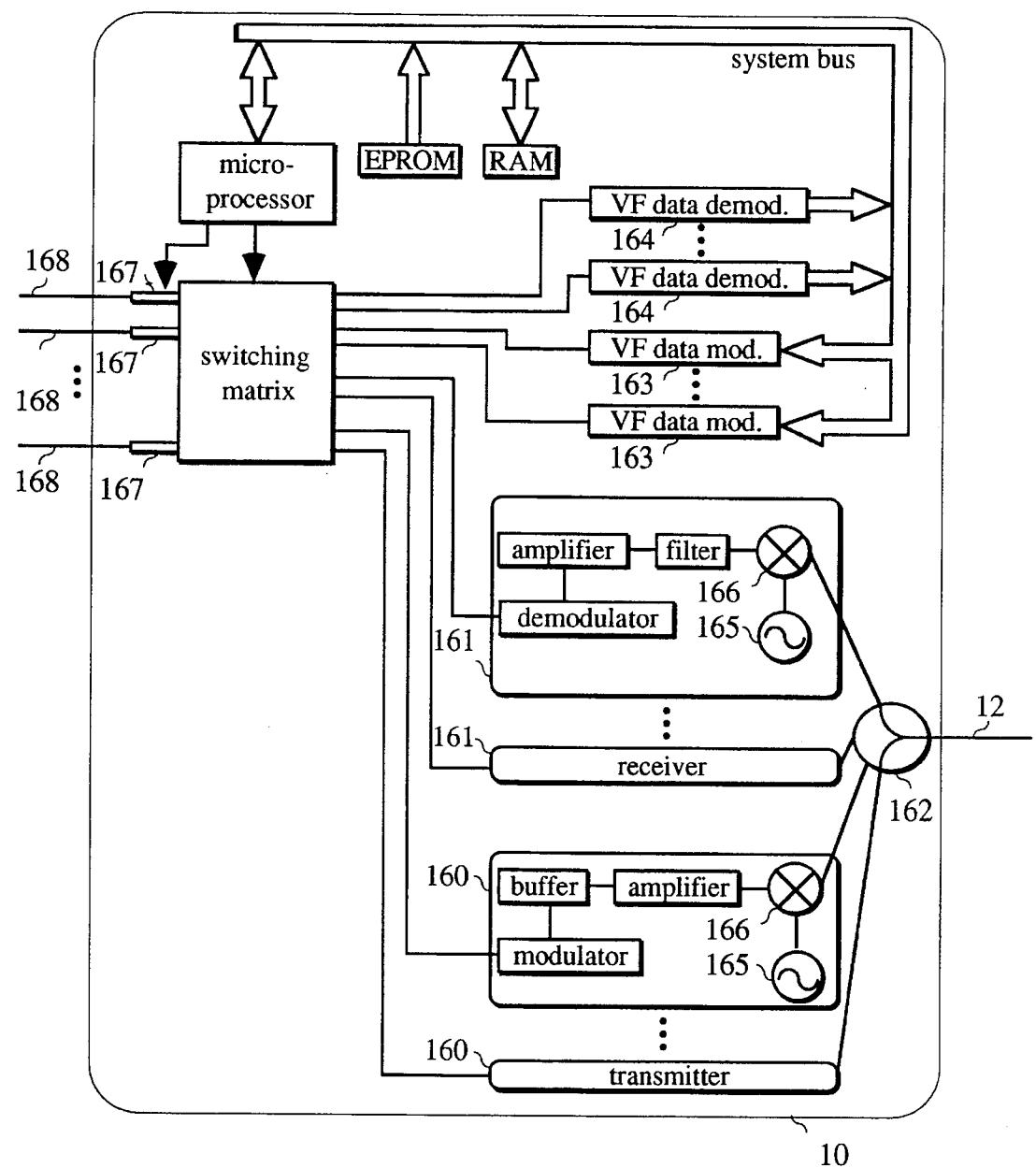
FIG. 16 is the system block diagram of the central controller for supporting telephone services.

The block diagram of the apparatus to implement this signalling method for the telephone service is depicted in FIG. 16 for the central controller. There are a plurality of transmitters 160 and a plurality of receivers 161 for communication on the shared transmission media 12. The duplexer 162 combines the transmitters' communication signals to be transmitted on the shared transmission media and duplicates the communication signals from the shared transmission media to each of these receivers. A number of voice frequency (VF) data modulators 163 and demodulators 164 similar to the conventional modem are provided for transmitting and receiving the signalling data. Each of the transmitters 160 and the receivers 161 has a oscillator 165 for tuning to the corresponding channels. The VF signal coming to the transmitter module 160 is first modulated, buffered, amplified and mixed with the oscillator's frequency to the RF channel. The RF signal coming to the receiver module 161 is translated to the intermediate frequency through the mixer 166, then filtered, amplified, and finally demodulated back to the VF signal. The switching matrix under the control of the microprocessor, is used to connect VF signals between transmitters, receivers, interface to the telephone networks, VF data modulator and demodulator. The telephone interface module 167 under the control of the micro-processor performs the hybrid function to separate the signals in the transmit and receive direction (2-wire to 4-wire conversion), and the signalling function to/from the telephone network 168. The Random Access Memory or RAM is used to store the dynamic information such as remote terminal and channel status. The Erasable Programmable Read Only Memory or EPROM is used to store the invariant information such as instructions to the micro-processor at startup. The micro-processor communicates with EPROM, RAM, and the data modulators and demodulators via the system bus.

To allocate a forward signalling data channel, the central controller 10 determines an available VF data modulator 163, a transmitter module 160, and then commands the switching matrix to make the connection between the VF data modulator 163 and the RF transmitter 160. The signalling information or sporadic user data will come from the micro-processor to the VF modulator 163 via the system bus, and then the modulated VF signal is fed to the input of the transmitter module 160 via the connection through the switching matrix before it is modulated to the RF channel. To allocate a reverse signalling data channel, the central controller determines an available VF data demodulator 164, a receiver module 161, and commands the switching matrix to make the connection between the VF data demodulator 164 and the RF receiver 161. The signalling information or the sporadic user data follows the reverse direction as the forward direction. To establish a telephone connection, the central controller determines an available telephone interface module 167, a transmitter module 160, a receiver module 161, and commands the switching matrix to make the connection between the telephone interface module 167 and the transmitter 160 and receiver modules 161. The voice traffic is separated into the transmit and receive direction and connected through the switching matrix to the transmitter and receiver modules for modulating to and demodulating from the RF channels. Although the micro-processor needs to be involved in the path of data transfer, it is possible to establish a modem pool by setting aside a number of the VF data modulators and demodulators, and connecting them to the telephone interface module 167. The data signal from the remote terminals are decoded by the VF data demodulator 164, routed by the microprocessor, and then fed to the VF data modulator 163. Through the connection between the VF data modulator 163 and telephone interface module 167, the modulated data signal is transmitted to the telephone network. The data signal from the telephone network traverses in the reverse direction.

Figure 17:
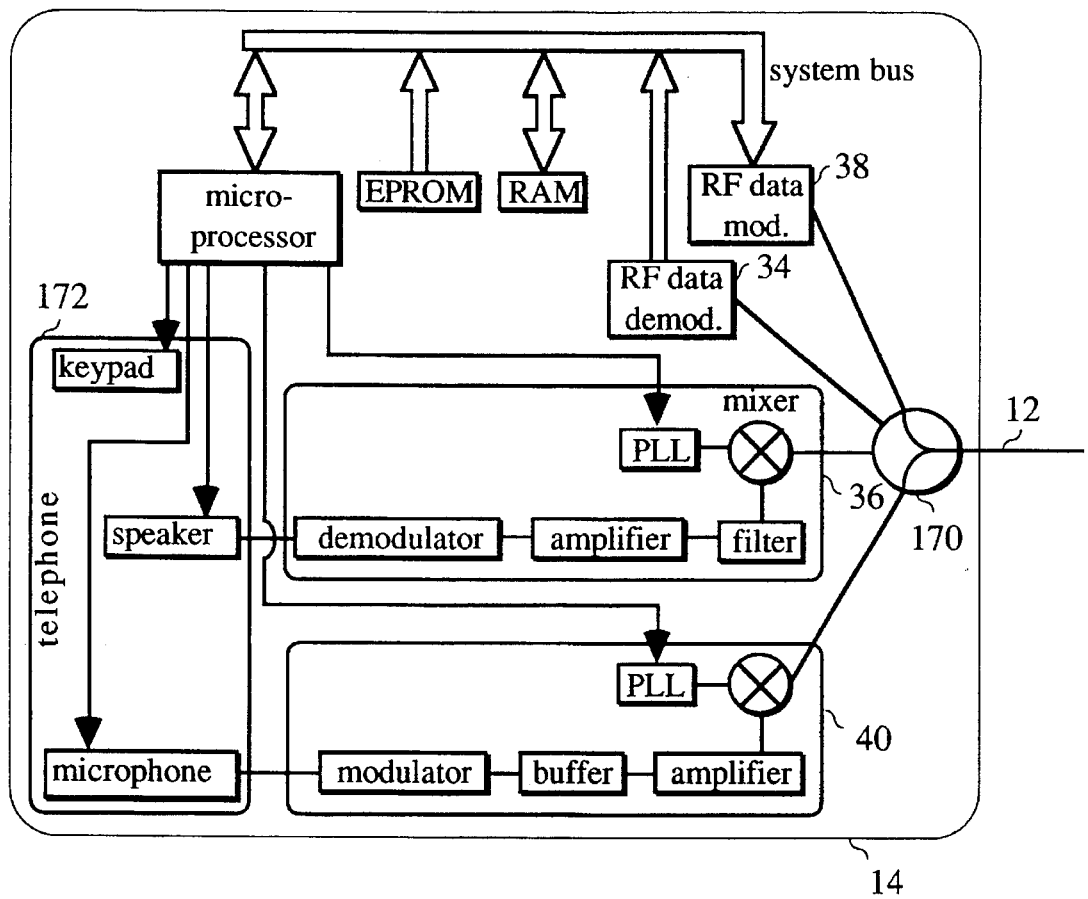
FIG. 17 is the system block diagram of a remote terminal for supporting telephone services.

The apparatus to implement this signalling method for the telephone service is depicted in FIG. 17 for the remote terminals, which comprises a transmitter 40 and a receiver 36 for communication on the shared transmission media 12, a RF data modulator 38 and a RF data demodulator 34 for signalling data channels. The transmitter 40, the receiver 36, the data modulator 38 and the data demodulator 34 are all capable of tuning to the assigned RF frequency. The duplexer 170 combines the transmitters' communication signals to be transmitted on the shared transmission media 12 and duplicates the communication signals from the shared transmission media to each of these receivers. The micro-processor communicates with EPROM, the RAM, and the data modulator and demodulator via the system bus. The keypad, the speaker, and the microphone make up the conventional telephone set 172. The audio signal from the microphone feeds to the modulator to be transmitted on the assigned channel over the shared transmission media. Similarly the speaker gets the demodulated signal from the receiver tuned to the assigned channel. In this block diagram, sporadic user data shares the RF data modulator and demodulator with signalling information, while the telephone section provides voice traffic through the RF transmitter and receiver. If the data communication is to be supported using a dedicated circuit, the audio interface of a conventional modem can be connected to the input of the modulator of the transmitter and to the output of the demodulator of the receiver.

At startup, the modulator and the demodulator are tuned to the primary forward and reverse signalling data channels respectively. The micro-processor interprets the signalling command and instruct the Phased Lock Loop or PLL according to the command from the central controller. The transmitter and the receiver modules are enabled and tuned to the assigned channels when the connection is established. The micro-processor also controls the functioning of the microphone, the keypad and the speaker.

From the foregoing, it will be observed that numerous variations and modifications may be effected without departing from the true spirit and scope of the novel concept of the invention. It should be understood that no limitation with respect to the specific structure and circuit arrangements illustrated is intended or should be inferred. It is, of course, intended to cover by the appended claims all such modifications as fall within the scope of the claims.

Thus, in accordance with the invention, a Dynamic Channel Management And Signalling Method And Apparatus has been provided accomplishing all of the objects, and having the features and advantages specified at the beginning of this specification.

It is to be understood that the disclosed construction of the invention may be embodied in other forms within the scope of the claims.

What is claimed is:

1. In a multiple access communication system comprising a central controller, a shared transmission means for signalling data and user information, and a plurality of remote terminals, a method of allocating signalling data channels between said central controller and said plurality of remote terminals from a plurality of communication channels and of assigning remote terminals comprising the steps of:

(a) establishing communications between said central controller and said plurality of remote terminals via a plurality of signalling data channels, each of said remote terminals being initially assigned to a pair of predetermined signalling data channels;

(b) monitoring the status of a plurality of the signalling data channels in use between said central controller and said plurality of remote terminals for the usability of said signalling data channels;

(c) determining whether one of said plurality of remote terminals needs to be reassigned to a different signalling data channel other than said predetermined signalling data channel;

(d) determining whether a different and suitable signalling data channel is available other than said predetermined channel; and (e) reassigning by said central controller said remote terminal to a different and suitable signalling data channel for communication henceforward.

2. In a multiple access communication system according to claim 1, said step of establishing communications between said central controller and said plurality of remote terminals via a plurality of signalling data channels comprising the steps of:

(a) polling by said central controller said plurality of remote terminals on a pair of predetermined primary forward and backup forward signalling data channels for an activated remote terminal;

(b) sensing by an activated remote terminal for a polling message from said central controller on a predetermined backup forward signalling data channel if said predetermined primary forward signalling data channel is unavailable to said activated remote terminal because of its failure to sense a polling message during a predetermined period of time;

(c) transmitting a registration message from said activated remote terminal to said central controller on a predetermined primary reverse signalling data channel; and (d) retransmitting said registration message on a predetermined backup reverse signalling data channel if said primary reverse signalling data channel is unavailable to said activated remote terminal because of its failure to sense a response from said central controller to said registration message after a predetermined period of time.

3. In a multiple access communication system according to claim 1, said step of monitoring the status of a plurality of the signalling data channels in use between said central controller and said plurality of remote terminals for the usability of said signalling data channels comprising the steps of:

(a) calculating the aggregate traffic load requirements of said plurality of signalling data channels in use;

(b) monitoring the past collision count of said plurality of signalling data channels in use;

(c) monitoring the transmission error count of said plurality of signalling data channels in use; and (d) sensing the status of said plurality of signalling data channels in use for failure.

4. In a multiple access communication system according to claim 1, said step of determining whether one of said plurality of remote terminals needs to be reassigned to a different signalling data channel other than said predetermined signalling data channel comprising the steps of:

(a) sensing the status of said predetermined signalling data channel which said terminal has been assigned to for overloading to determine whether said terminal needs to be reassigned to a different signalling data channel because of overloading; and (b) sensing the status of said predetermined signalling data channel which said terminal has been assigned to for failure to determine whether said terminal needs to be reassigned to a different signalling data channel because of failure.

5. In a multiple access communication system according to claim 1, said step of determining whether a different and suitable signalling data channel is available other than said predetermined channel comprising the steps of:

(a) sensing the status of other signalling data channels other than said predetermined channel for spare capacity; and (b) allocating a new signalling data channel if no signalling data channel has spare capacity and a new signalling data channel is available.

6. In a multiple access communication system comprising a central controller, a shared transmission means and a plurality of remote terminals, a method of controlled multiple access between said central controller and said plurality of remote terminals comprising the steps of:

(a) establishing communications between said central controller and each of said plurality of remote terminals via predetermined signalling data channels of a plurality of signalling data channels, each of said plurality of remote terminals can be assigned to any pair of said plurality of signalling data channels;

(b) polling a plurality of said plurality of remote terminals simultaneously by said central controller for determining whether there is any pending request from said plurality of remote terminals; and (c) resolving contention among said plurality of remote terminals by said central controller if there is a pending request from more than one remote terminal on the same signalling data channel.

7. In a multiple access communication system according to claim 6, said step of polling a plurality of said plurality of remote terminals simultaneously by said central controller for determining whether there is any pending request from said plurality of remote terminals comprising the steps of:

(a) polling said plurality of remote terminals by said central controller on one of said plurality of signalling data channels; and (b) responding to said polling by said central controller by only those of said plurality of remote terminals which have a pending request.

8. In a multiple access communication system according to claim 6, said step of resolving contention among said plurality of remote terminals if there is a pending request from more than one remote terminal on the same signalling data channel comprising the steps of:

(a) detecting data transmission errors due to collision of pending requests from said plurality of remote terminals;

(b) alerting a plurality of remote terminals assigned to a signalling data channel to avoid using said signalling data channel where collision occurred;

(c) polling said plurality of remote terminals by said central controller for identifying one of said plurality of remote terminals involved in the collision; and (d) transmitting a signal from said central controller to said identified remote terminal indicating that said central controller will process its pending request.

9. In a multiple access communication system according to claim 8, said step of polling said plurality of remote terminals by said central controller for identifying one of said plurality of remote terminals involved in the collision by continuing polling by said central controller before receiving any responses from said plurality of remote terminals.

10. The multiple access communication system of claim 6 further comprising the step of determining whether there is a command from said central controller to one or more of said plurality of remote terminals.

11. In the multiple access communication system of claim 6, said step of polling a plurality of said plurality of remote terminals simultaneously by said central controller for determining whether there is any pending request from said plurality of remote terminals comprising the steps of:

(a) polling by said central controller said plurality of remote terminals in parallel on two or more of said plurality of signalling data channels; and (b) responding to said polling by said central controller by only those of said plurality of remote terminals which have a pending request.

12. In a multiple access communication system according to claim 6, said step of polling a plurality of said remote terminals simultaneously by said central controller for determining whether there is any pending request from said plurality of remote terminals by continuing polling by said central controller before receiving any responses from said plurality of remote terminals.

13. In a multiple access communication system according to claim 6, said step of resolving contention among said plurality of remote terminals if there is a pending request from more than one remote terminal on the same signalling data channel further comprising the step of identifying one of said more than one remote terminal that has a pending request by polling groups of said plurality of remote terminals.

14. In a multiple access communication system having a plurality of communication channels for communicating with a plurality of remote terminals, a central controller comprising:

(a) system controlling means for controlling the communication system comprising a micro-processor and associated EPROM and RAM;

(b) transmitting means for transmitting user traffic or signalling data on said communication channels;

(c) receiving means for receiving user traffic or signalling data on said communication channels;

(d) modulating means for modulating signalling data;

(e) demodulating means for demodulating signalling data;

(f) interfacing means for interfacing to a wide area network;

(g) switching means for making dynamic connections to switch signals among said transmitting means, said receiving means, said modulating means, said demodulating means, and said interfacing means; and (h) forward communication controlling means for selecting a forward signalling data channel via a dynamic connection between said transmitting means and said modulating means.

15. In a multiple access communication system having a plurality of communication channels for communicating with a plurality of remote terminals according to claim 14, said central controller further comprising reverse communication controlling means for selecting a reverse signalling data channel via a dynamic connection between said receiving means and said demodulating means.

16. In a multiple access communication system having a plurality of communication channels for communicating with a plurality of remote terminals according to claim 15, said central controller further comprising remote terminal communication controlling means for connecting a plurality of remote terminals via dynamic connections between said transmitting means and said receiving means.

17. In a multiple access communication system having a plurality of communication channels for communicating with a plurality of remote terminals according to claim 16, said central controller further comprising wide area network communication controlling means for connecting a plurality of remote terminals to a plurality of wide area networks via dynamic connections among said transmitting means, said receiving means and said interfacing means.

18. In a multiple access communication system having a plurality of communication channels for communicating with a plurality of remote terminals according to claim 17, said central controller further comprising modem communication controlling means for establishing a plurality of data modem connections to a wide area network via dynamic connections among said transmitting means, said receiving means, said modulating means, said demodulating means, and said intefacing means.

19. In a multiple access communication system having a central controller, a plurality of communication channels, and a plurality of remote terminals, each of said plurality of remote terminals comprising:

(a) user traffic transmitting means for transmitting user traffic on an assigned communication channel;

(b) user traffic receiving means for receiving user traffic on an assigned communication channel;

(c) signalling data transmitting means for transmitting signalling data on an assigned communication channel;

(d) signalling data receiving means for receiving signalling data on an assigned communication channel;

(e) user interfacing means comprising a telephone with a keypad;

(f) system controlling means for controlling the communication system comprising a micro-processor and associated EPROM and RAM and (g) communication controlling means for tuning said signalling data transmitting means and for tuning said signalling data receiving means under control of said central controller a pair of assigned communication channels via said micro-processor and associated EPROM and RAM.

20. In a multiple access communication system according to claim 19, said system controlling means further comprising a program for resolving contention in a multiple access system by responding to polling by said central controller.

\* \* \* \* \*